(No Model.)

D. HIGHAM.
DYNAMO ELECTRIC MACHINE.

No. 399,403. Patented Mar. 12, 1889.

Witnesses:
David S. Williams
Alex Barkoff

Inventor:
Daniel Higham,
by his Attorneys
Howson & Howson

UNITED STATES PATENT OFFICE.

DANIEL HIGHAM, OF PHILADELPHIA, PENNSYLVANIA.

DYNAMO-ELECTRIC MACHINE.

SPECIFICATION forming part of Letters Patent No. 399,403, dated March 12, 1889.

Application filed June 7, 1888. Serial No. 276,345. (No model.)

*To all whom it may concern:*

Be it known that I, DANIEL HIGHAM, a citizen of the United States, and a resident of Philadelphia, Pennsylvania, have invented an Improved Dynamo-Electric Machine or Electric Motor, of which the following is a specification.

The object of my invention is to so construct the frame of a dynamo-electric machine or electric motor that the building or construction of the machine will be economical and simple and the machine itself efficient.

Figure 1:
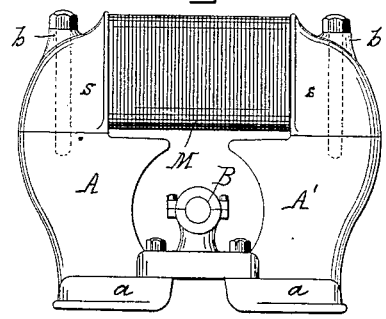
Figure 2:
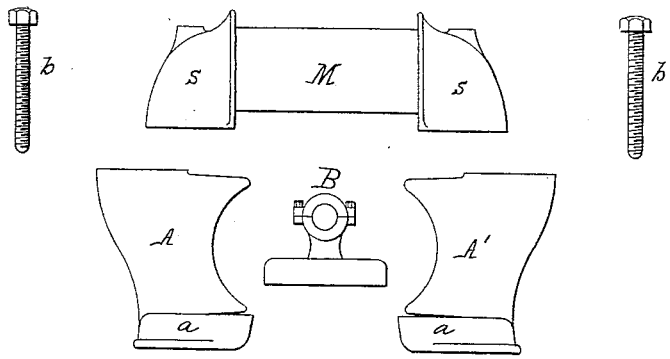
Figure 3:
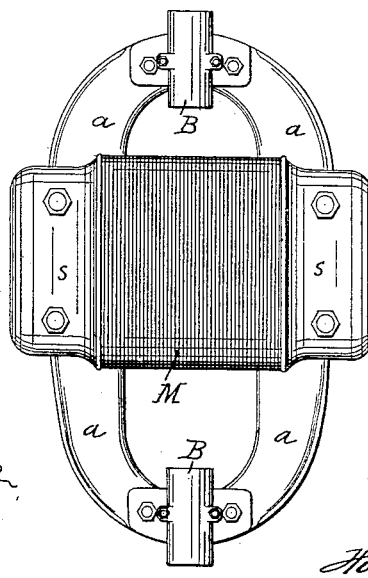

In the accompanying drawings, Figure 1 is a side view of a dynamo-electric machine or electric motor constructed in accordance with my invention, the armature being omitted. Fig. 2 illustrates the main parts of the frame of the machine detached from each other, and Fig. 3 is a plan view of the machine as shown in Fig. 1.

A A' are the pole-pieces of the field-magnet, between which the armature revolves, and the bases of these pole-pieces are extended to form feet $a$, which at their extreme outer ends are curved inward toward each other, but not so much as to come too near together. These feet, thus forming the base of the machine, are connected at their adjoining ends by means of journal boxes or bearings B, of brass or other non-magnetic metal, for the armature-shaft. The field-magnet core M is arranged with its axis horizontal, and has its opposite ends resting upon the opposite pole-pieces, and the core thus supported by the pole-pieces is bolted thereto by means of suitable bolts, $b$. Shoulders $s$ are formed upon the core, so as to leave a proper space to receive the windings, and the line of separation between the field-magnet core and the pole-pieces is in such a position as to leave a shoulder on the under side of the core, as well as on the upper side and the outer edges; or, in other words, the line of separation of the core from the field-magnets will be beyond the outer layer of the field-magnet coils, so that washers will not be needed at the ends of the coils.

I have found the described construction of frame for dynamo-electric machines or electric motors to be not only economical and simple in construction and easily repaired or rewound, but also to be a very efficient one.

I claim as my invention—

1. A frame for a dynamo-electric machine or electric motor having a horizontal field-magnet core resting upon and secured to the pole-pieces between which the armature revolves.

2. A dynamo-electric machine or electric motor having a horizontal field-magnet core resting upon and secured to pole-pieces, the line of separation between the core and pole-pieces being below the coils of the field-magnet winding.

3. A dynamo-electric machine or electric motor having pole-pieces, with extended bases curved at their outer adjacent ends toward each other, and supporting non-magnetic bearings for the armature-shaft.

In testimony whereof I have signed my name to this specification in the presence of two subscribing witnesses.

DANIEL HIGHAM.

Witnesses:
HARRY SMITH,
HENRY HOWSON.